D. J. TITTLE.
Potato Digger.
No. 53,363.
Patented Mar. 20, 1866.
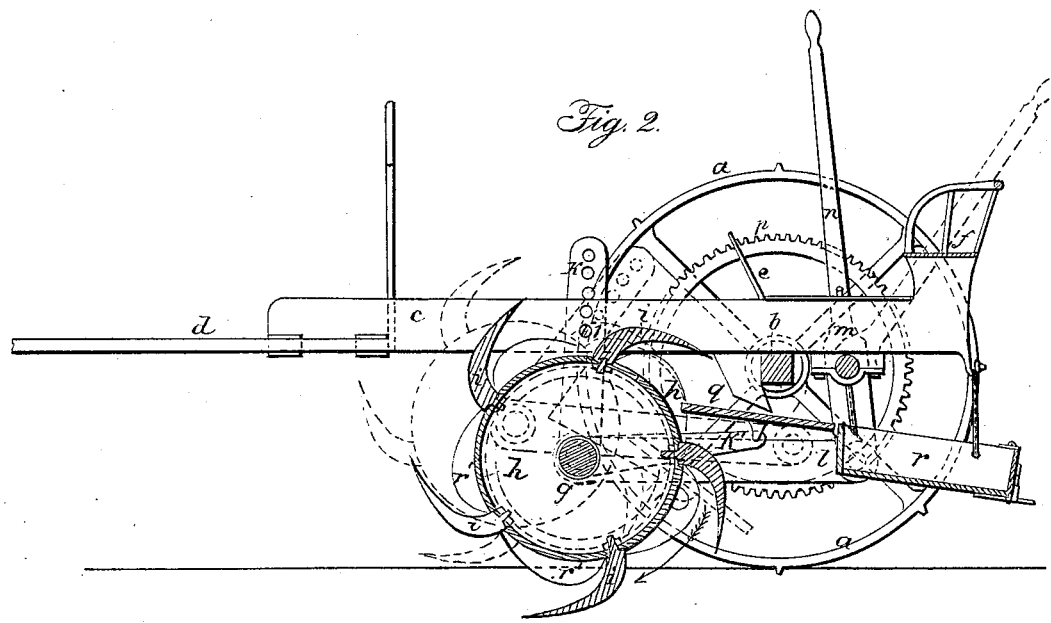
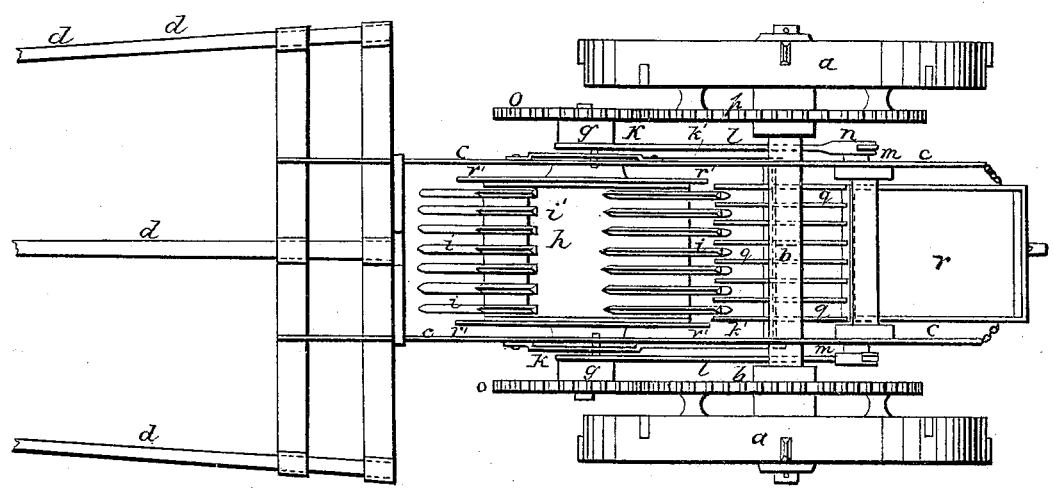
Witnesses:
Inventor:

United States Patent Office.

DANIEL J. TITTLE, OF ALBANY, NEW YORK.

IMPROVEMENT IN POTATO-DIGGERS.

Specification forming part of Letters Patent No. 53,363, dated March 20, 1866.

*To all whom it may concern:*

Be it known that I, DANIEL J. TITTLE, of Albany, in the county of Albany and State of New York, have invented, made, and applied to use a certain new and useful Improvement in Potato-Diggers; and I do hereby declare the following to be a full, clear, and exact description of the said invention, reference being had to the annexed drawings, making part of this specification, wherein—

Figure 1 is a plan of the said potato-digger with the driver's seat removed, and Fig. 2 is a vertical longitudinal section.

Similar marks of reference denote the same parts.

Potato-diggers have heretofore been made in which the potatoes, after they are raised by a scoop, have been thrown over by a rotary-toothed cylinder.

The nature of my said invention consists in a cylinder of digging-forks revolved by the wheels that sustain the machine, and acting to raise the potatoes and throw them over upon an inclined grate, over which they roll and are freed from the earth previous to passing into the receptacle provided for said potatoes, the said cylinder of forks being fitted in such a manner that it can be simultaneously disconnected from the drivers and elevated, so as to be driven to the field or turned around with ease at the end of the rows.

In the drawings, $a$ $a$ are the wheels on the axle $b$. $c$ is the frame of the digger, and $d$ the shafts, three in number, into which a pair of horses are harnessed, said horses walking between the rows of potatoes, and the wheels $a$ $a$ also running in the same places. The shafts $d$ sustain the forward end of the frame $c$ against the action of the diggers as they rise out of the ground. These diggers $i$ $i$ are formed as prongs or forks, projecting from the surface of the cylinder $h$, mounted upon the shaft $g$ in the hangers $k$, that are set in mortises in the frames $c$, and may be raised up or lowered and sustained by a cross bolt or pin, 1, according to the depth of the potatoes in the earth.

$l$ $l$ are links from the shaft $g$ to arms or cranks at the ends of the cross rock-shaft $m$, provided with a lever, $n$, at one end. By this arrangement the cylinder $h$ can be thrown forward, and thereby raised sufficiently to cause the tines or forks $i$ to clear the ground in driving to the field or in turning at the ends of the row, as seen by the red lines, Fig. 2. The shaft $g$ has at its ends gear-wheels $o$ $o$, taking the gear-wheels $p$ $p$ upon the wheels $a$ $a$, so that the cylinder $h$ is revolved in the direction of the arrow as the digger is drawn along, and the forks or tines $i$ $i$ pass under the potatoes, raising them and throwing them over the cylinder $h$, and in falling against the rear of the previous range of forks the earth is knocked off and allowed to pass away. The potatoes, being received on the inclined grate $q$, are further freed from earth as they run over the grate into the box $r$. The grate $q$ is sustained by a cross-bar at the ends of arms $k'$, extending horizontally from the hangers $k$, and the bars of said grate $q$ are located so that the forks or tines $i$ pass through between them.

The box $r$ may be fitted with a swinging tail-board and catch, so as to be opened for the delivery of the potatoes. The cylinder $h$ is provided with side plates, $r'$, that are bolted to the edges of the said cylinder, and these side plates prevent the earth or potatoes falling laterally from the forks $i$ as they raise up said potatoes.

The teeth or forks $i$ are formed with shanks or tines passing into the plates composing the periphery of the cylinder $h$, and nuts in the inside secure these forks $i$ in place. If the forks $i$ are required to set farther out from the cylinder the edges of the plates to which said rows of teeth are affixed may be loosened by unscrewing the bolts that attach said plates to the ends of the cylinder $h$, and blocking-pieces be introduced under the forward edges of such plates, so as to throw the points of the forks $i$ farther away from the shaft $g$.

The speed of the cylinder $h$ and forks may be regulated by the relative sizes of the gears $o$ and $p$.

What I claim, and desire to secure by Letters Patent, is—

1. The revolving digging-cylinder, constructed substantially as specified, in combination with the swinging frame $k$ $l$ and lever $n$, for connecting or disconnecting the digger from its operative mechanism, as set forth.

2. The side plates, $r'$, fitted to the revolving digging-cylinder, as and for the purposes specified.

3. The revolving digging-cylinder $h$, actuated in the manner set forth, in combination with the grate $q$ and receptacle $r$, sustained by the frame $k'$ and $c$, as set forth.

4. Two or more shafts, $d$, connected rigidly to the frame, in combination with the digging-cylinder, actuated as set forth, and the sustaining-wheels, so that the digging-cylinder is sustained by the shafts to the horses when said cylinder is raised, as set forth.

In witness whereof I have hereunto set my signature this 29th day of November, 1865.

DANIEL J. TITTLE.

Witnesses:
LEMUEL W. SERRELL,
CHAS. H. SMITH.